United States Patent [19]

Duyvesteyn et al.

[11] Patent Number: 5,304,359
[45] Date of Patent: Apr. 19, 1994

[54] DISSOLUTION OF PLATINUM GROUP METALS FROM MATERIALS CONTAINING SAID METALS

[75] Inventors: Willem D. C. Duyvesteyn, San Jose; Houyuan Liu, Sunnyvale, both of Calif.; Saskia Duyvesteyn, Cambridge, Mass.

[73] Assignee: BHP Minerals International Inc., Reno, Nev.

[21] Appl. No.: 845,068

[22] Filed: Mar. 3, 1992

[51] Int. Cl.$^5$ .................... C01G 55/00; C22B 11/00
[52] U.S. Cl. ................................ 423/22; 423/38; 423/522
[58] Field of Search .................... 423/22, 38

[56] References Cited

U.S. PATENT DOCUMENTS

| | | | |
|---|---|---|---|
| 416,781 | 12/1889 | Goetz | 423/38 |
| 568,427 | 9/1896 | Cassel | 423/38 |
| 578,721 | 3/1897 | Cassel | 423/38 |
| 732,709 | 7/1903 | Cassel | 423/38 |
| 2,283,198 | 5/1942 | Fink et al. | 423/38 |
| 3,488,144 | 1/1970 | Sargent | 423/22 |
| 3,985,854 | 10/1976 | Bradford et al. | 423/22 |
| 4,997,532 | 3/1991 | Flax | 423/22 |

FOREIGN PATENT DOCUMENTS

| | | | |
|---|---|---|---|
| 17033 | of 1888 | United Kingdom | 423/38 |
| 7555 | of 1898 | United Kingdom | 423/38 |

*Primary Examiner*—Wayne Langel
*Assistant Examiner*—Steven Bos
*Attorney, Agent, or Firm*—Hopgood, Calimafde, Kalil, Blaustein & Judlowe

[57] ABSTRACT

A method is provided for the dissolution of at least one precious metal selected from the group consisting of platinum group metals, gold and silver. The method comprises subjecting a material containing at least one of the precious metals to dissolution with a sulfuric acid solution maintained at a pH at least sufficient to complex the precious metal with bromide ions in the presence of an oxidizing agent, the amount of bromide ions in the solution being at least sufficient to form a soluble complex of the precious metal. The amount of oxidizing agent is at least sufficient to maintain a redox potential at least high enough to convert the precious metal to an ionic form conducive to forming a soluble bromide complex thereof.

10 Claims, No Drawings

DISSOLUTION OF PLATINUM GROUP METALS FROM MATERIALS CONTAINING SAID METALS

This invention relates to the dissolution of platinum group metals (PGM) from materials containing said metals.

BACKGROUND OF THE INVENTION

General speaking, the dissolution of precious metals, such as PGM's, was thought to be possible only by the use of aggressive chemicals. A well known process is cyanide dissolution of precious metals.

Dissolution of precious metals with a cyanide solution, e.g., sodium cyanide solution, is relatively easy, particularly the dissolution of PGM's, gold and silver in their elemental state to form cyano-complexes that are stable in aqueous solutions. However, if PGM's exist in mineral form, it may be necessary to liberate the precious-metals, for example, by converting them into their elemental states or other soluble form before dissolving them with a cyanide solution.

A disadvantage of cyanide dissolution is that it presents environmental problems and particular care must be taken in disposing of waste solutions. Moreover, cyanides are costly materials which make their use economically undesirable.

Another aggressive chemical employed to dissolve precious metals is agua regia. Agua regia insures dissolution of PGM's, as well as gold and silver, because of its high acidity, its high redox potential (due to the presence of nitric acid), and its high concentration of complexing ions (12M chloride ions) for complexing the precious metals.

However, the use of aqua regia has its economic disadvantages because of its unacceptable high reagent use, cost and consumption.

Work has been reported regarding the use of bromine for leaching gold from ores. It was found that a relatively low bromide ion concentration can be used to effect dissolution of gold, for example, 0.1M bromide ions, as compared to the much higher chloride ion concentration (12M chloride ions) required for dissolution with aqua regia.

In this connection, reference is made to an article by Batric Pesic et al entitled Dissolution of Gold with Geobrom 3400, Fundamental and Applied Studies, which was delivered at the Proceedings of the 13th IMPI Conference at Montreal Precious Metals 1989.

Geobrom 3400 (which is the trademark of a product of Great Lake Chemical Corporation) is a solution containing about 34% free bromine. According to the aforementioned article, the bromine solution was used to dissolve gold from gold concentrates and electronic scrap. Rotating disc studies were conducted using a rotator a speed controller, a reactor, and a water bath. A typical experiment comprised a 500 ml solution containing 5 ml/l of Geobrom 3400 at a natural pH at a temperature of 25° C., the stirring being carried out at 500 rpm.

The studies indicated that bromine provided a substantially higher rate of gold dissolution than dissolution with sodium cyanide or thiourea.

The use of bromine for the dissolution of gold is disclosed in another article entitled Leaching and Recovery of Gold From Black Sand Concentrate and Electrochemical Regeneration of Bromine by A. Dadgar et al. This article was presented before the Society for Mining, Metallurgy, and Exploration, Inc. at Reno, Nev. on Sep. 10-12, 1990. This paper describes the leaching of gold with Geobrom 3400 from very rich black sand concentrate and its subsequent recovery by ion exchange resins and solvent extraction.

We have discovered a method for the dissolution of precious metals, e.g., PGM's, gold and silver by simply using a sulfuric acid solution relatively low in halide concentration and of controlled redox potential at least sufficient to convert the precious metal to an ionic form conducive to forming a soluble bromide complex thereof.

OBJECTS OF THE INVENTION

One object of the invention is to provide an aqueous sulfuric acid solution containing sufficient bromide ions to effect the dissolution of platinum group metals from materials containing said metals.

Another object of the invention is to provide a method for the dissolution of platinum group metals selected from the group consisting of platinum, palladium, rhodium and rothenium contained in materials selected from the group consisting of ores, precious metal scrap, metallurgical intermediates, and the like.

These and other objects will more clearly appear from the following disclosure.

SUMMARY OF THE INVENTION

The present invention is particularly applicable to the dissolution of platinum group metals contained in a wide variety of materials preparatory to recovery of said metals by known methods. Examples of such materials include ores containing platinum group metals, gold ores, silver ores, metallurgical intermediates, such as mattes and electrolytic sludges containing precious metals, for example, electrolytic anode sludges resulting from the electrolytic purification of nickel and copper anodes obtained in the pyrometallurgical treatment of nickel and copper ores containing precious metals. The platinum group metal-containing ores include ores containing one or more of the compounds consisting of sulfides, arsenides, tellurides, selenides, antimonides and bismuthinides, as well as ores containing carbon.

Other sources of PGM's silver include precious metal scrap, such as jewelry scrap, electronic metal scrap, spent catalysts, and the like material.

Depending upon the material being treated, it may be necessary to subject the material to a pre-treatment to liberate occluded precious metal and put it in a form to permit the dissolution thereof. This is usually required where the precious metal is contained in an ore, such as ores containing platinum arsenide minerals and the like. Generally, a simple roasting procedure at a relatively high temperature may be employed to break down the minerals and liberate the precious metals.

The solution employed for the dissolution of precious metals is basically a sulfuric acid solution containing an oxidizing agent and bromide ions in amounts sufficient to effect dissolution of the precious metals, for example, PGM's.

Stating it broadly, one embodiment of the invention is directed to a method for the treatment of a precious metal-containing material with the object of solubilizing the contained precious metal. The method comprises subjecting the material to dissolution with a sulfuric acid solution maintained at a pH at least sufficient to complex the precious metal with bromide ions in the presence of an oxidizing agent. The amount of bromide ions in the sulfuric acid solution is at least sufficient to form a soluble complex with the precious metal, a stoichiometric excess of said bromide ions being preferred, for example, at least 0.01M excess. The amount of oxidizing agent in the solution is at least sufficient to maintain a redox potential at least high enough, e.g., at least about 700 mV as determined against a standard calomel electrode (SCE), to convert the precious metal to an ionic form conducive to forming a soluble bromide complex with the bromide ions.

Another embodiment of the invention is directed to a sulfuric acid solution composition suitable for the dissolution of precious metals comprising about 25 gpl to 250 gpl sulfuric acid containing an effective amount of bromide ions ranging up to about 5 molar sufficient to form a complex of said precious metals, the solution also containing a sufficient amount of an oxidizing agent, e.g., bromine, to provide a redox potential of at least about 700 mV as determined against a standard calomel electrode (SCE). In the dissolution of PGM's, it is preferred that the pH of the acid solution be below 1.

The bromide ion concentration preferably ranges from about 0.1 to 1 molar. Examples of bromide compounds suitable for carrying out the invention include alkali and alkaline earth metal bromides, sodium bromide being preferred.

Bromine is preferred as the oxidizing agent. Bromine exists in the liquid form and has a density of about 3.12 g/ml at 20° C. It boils at about 58.8° C. It is generally available dissolved in a solution of sodium bromide, a commercial grade being known as Geobrom 3400, the solution containing by weight about 34% of elemental bromine as $Br_2$, about 14.3% NaBr, about 6.25% NaOH and about 45.45% water, the density being about 1.8 grams/cc.

DETAILS OF THE INVENTION

The solution $NaBr/Br_2$ hydrolyzes in water to form HOBr and $Br^-$. Hypobromous acid (HOBr) has a dissociation constant of about $5 \times 10^{-9}$.

The acid HOBr is a strong oxidizing agent, the reduction products being either the bromide ion $Br^-$, or bromine ($Br_2$). The acid reacts with hydrogen ions as follows:

$$HOBr + H^+ 2e^- \rightarrow Br^- + H_2O \qquad (1)$$

$$2HOBr + 2H^+ 2e^- \rightarrow Br_2 + 2H_2 \qquad (2)$$

In reaction (1), $E° = 1.34$ V; while in reaction (2), $E° = 1.60$ V. Reactions (1) and (2) are pH dependent, and as clearly appears, the oxidizing strength of HOBr increases as the pH decreases by shifting the reaction to the right. HOBr decomposes in solution to form bromide and bromate ions.

$$3HOBr \rightarrow 2Br^- + BrO_3^- + 3H^{30} \qquad (3)$$

Reaction (3) is catalyzed by light and trace amounts of certain metal ions. If excess acid (e.g. bromic) is present, elemental bromine can be produced.

$$HOBr + Br^- + H^+ \rightarrow Br_2 + H_2O \qquad (4)$$

Bromic acid ($HBrO_3$) is a strong acid with a dissociation constant of $2 \times 10^{-1}$. Thus, bromate, produced by reaction (3), will be the predominant species at pH > 0.7.

Bromate is also a powerful oxidizing agent in acidic aqueous solutions, for example, as follows:

$$BrO_3^- + 6H^+ + 6e^- \rightarrow Br^- + 3H_2O \quad E° = 1.42 \text{ V} \qquad (5)$$

$$BrO_3^- + 12H^+ + 10e^- \rightarrow Br_2 + 6H_2O \quad E° = 1.49 \text{ V} \qquad (6)$$

$$BrO_3^- + 5H^+ + 4e^- \rightarrow HOBr + 2H_2O \quad E° = 1.47 \text{ V} \qquad (7)$$

The reactions (5) to (7) are all pH dependent, the oxidizing strength of bromate increasing as pH decreases which is desirable in the dissolution of PGM's.

In the dissolution of platinum using a bromide solution, the platinum bromide complex acid $H_2PtBr_6$ is formed. The dissolution is achieved by adding sodium bromide and $Br_2$ (such as Geobrom 3400) to a sulfuric acid solution of composition ranging from about 25 gpl to 400 gpl and more preferably from about 50 gpl to 250 gpl or 50 gpl to 150 gpl.

The pH's of these solution are less than about 1 and generally less than about 0.75.

The alkali or alkaline earth metal bromide ranges up about 5 molar and preferably from about 0.1 to 1 molar.

The reaction of the bromide compound, e.g., sodium bromide, with sulfuric acid provides hydrobromic acid which is needed for platinum bromide complex formation. The free bromine added as a sodium bromide/bromine solution (e.g. Geobrom 3400) and the hydrobromic acid react with the platinum to form the stable complex $[PtBr_6]^{2-}$ $$H_2SO_4 + 2NaBr \rightarrow Na_2SO_4 + 2HBr \qquad (8)$$

$$PT° + 2Br_2 + 2HBr \rightarrow H_2PtBr_6 \qquad (9)$$

By working with a low pH as provided by the sulfuric acid solution, redox potentials of over 700 or 750 mV are assured to maintain $H_2PtBr_6$ in solution.

As illustrative of the invention as applied to various precious metal-containing materials, the following examples are given.

EXAMPLE 1

Dissolution tests were conducted on an oxide ore referred to as the Hartley oxide ore mined at the Hartley site in Zimbabwe. The chemical composition of this ore in the natural and the roasted state is given in following Table 1. The oxide ore in the natural state is designated as NOX-C and in the roasted state as NOXR-C. Such oxide ores may contain at least one compound selected from the group consisting of sulfides, arsenides, tellurides, selenides, antimonides and bismuthinides.

TABLE 1

| Element | NOX-C | NOXR-C |
|---|---|---|
| % Al | 2.19 | 2.34 |
| % Ca | 2.33 | 2.43 |
| % Fe | 9.81 | 10.1 |
| % K | 0.23 | 0.25 |
| % Mg | 13.2 | 14.1 |
| % Na | 0.21 | 0.25 |
| ppm Ag | 1.0 | 0.8 |
| ppm As | 42 | 38 |
| ppm Au | 0.75 | 0.81 |
| ppm Ba | 38 | 40 |
| ppm Be | 0.9 | 0.9 |
| ppm Bi | 11 | 38 |
| ppm Cd | 10 | 17 |
| ppm Ce | 7 | 8 |
| ppm Co | 148 | 156 |
| ppm Cr | 1640 | 1740 |

TABLE 1-continued

| Element | NOX-C | NOXR-C |
|---|---|---|
| ppm Cu | 1790 | 1890 |
| ppm Ga | 14 | 16 |
| ppm In | 3 | <2 |
| ppm La | <2 | <2 |
| ppm Mn | 1660 | 1760 |
| ppm Mo | 8 | 7 |
| ppm Nb | 17 | 14 |
| ppm Ni | 3400 | 3600 |
| ppm P | 240 | 255 |
| ppm Pb | 9 | 14 |
| ppm Pd | 1.42 | 1.60 |
| ppm Pt | 5.13 | 5.42 |
| ppm Rb | 12 | 12 |
| ppm Rh | 0.31 | 0.35 |
| ppm Sb | <5 | <5 |
| ppm Sc | 19.9 | 20.8 |
| ppm Sn | <5 | <5 |
| ppm Sr | 27 | 27 |
| ppm Th | 19 | 15 |
| ppm Ti | 990 | 965 |
| ppm Tl | <2 | <2 |
| ppm V | 148 | 154 |
| ppm W | <5 | <5 |
| ppm Y | 3.3 | 3.5 |
| ppm Zn | 79 | 92 |
| ppm Zr | 11 | 10 |

The ore was ground to provide a particle size distribution in which 92% was less than 38 micron. This particular size contained the bulk of the precious metals as will be clearly apparent from Table 2 below.

TABLE 2

| Element | Particle Size | | |
|---|---|---|---|
|  | <38 μm | 38–75 μm | 75–150 μm |
| Gold Assay | 0.55 ppm | 0.42 ppm | 0.25 ppm |
| Platinum Assay | 3.90 ppm | 1.74 ppm | 0.17 ppm |
| Rhodium Assay | 0.3 ppm | 0.1 ppm | 0.0 ppm |
| Gold Distribution | 89.8% | 10.0% | 0.2% |
| Platinum Distribution | 93.9% | 6.1% | 0.0% |
| Rhodium Distribution | 95.4% | 4.6% | 0.0% |

Roasting tests which were conducted at a temperature ranging from 150° C. to 1050° C. indicated that a temperature in the range of about 275° C. to 550° C. was preferred.

In one test, the ore was subjected to an oxidizing roast of 550° C. for one hour in a muffle furnace in the presence of air. About 50 grams of the roasted ore was slurried in 210 ml of solution containing 2N $H_2SO_4$ (100 gpl), 2.2 grams NaBr (0.1N) and 0.29 ml of Geobrom 3400 containing 34% bromine. The Geobrom 3400 had a density of about 1.8 The 50 grams of the ore calculated to 240 gpl, the amount of bromine per liter being about 0.84 gram which corresponds to about 0.0053 molar.

At least 90% of the platinum was dissolved in 90 minutes as shown in Table 3 below, the test having been conducted for 3 hours.

TABLE 3

| Time | 0 min | 15 min | 30 min | 45 min | 60 min | 90 min | 2 hr | 3 hr |
|---|---|---|---|---|---|---|---|---|
| ORP (mV) | 860 | 850 | 855 | 840 | 834 | 827 | 817 | 718 |
| Acidity (N) | 2.0 | 1.57 | 1.38 | 1.32 | 1.27 | 1.20 | 1.20 | — |
| Geobrom (ml) | 0.29 | — | — | — | — | — | — | — |
| Pt ppm | — | 0.65 | 0.87 | 0.98 | 0.89 | 0.97 | 0.94 | 0.81 |
| % Pt Dissol | — | 53% | 73% | 85% | 82% | 91% | 93% | — |

The redox potential was in excess of 800 mV (determined against a standard calomel electrode) during two hours of dissolution.

The consumption of Geobrom 3400 calculated to about 10.4 kg/ton of ore. The residue weight following completion of platinum dissolution was 41.3 grams.

In another test in which a roasting temperature of 300° C. was used for one hour, the 210 ml solution contained 2.2 grams NaBr, 100 gpl sulfuric acid and 0.26 ml Geobrom, the amount of ore being the same, i.e., 50 grams or 240 gpl. The Geobrom 3400 consumption was about 12 Kg/ton of ore. About 94% of the gold was dissolved, about 72% of the platinum and approximately 53% of the rhodium.

Generally speaking, the amount of bromine should be at least sufficient to provide dissolution of at least 50% of the contained platinum and gold, for example, the concentration of $Br_2$ should be at least $10^{-5}$ molar and ranging up to about 0.1 molar.

EXAMPLE 2

Automobile catalyst scrap is an attractive source of PGM's, particularly platinum and rhodium. One type of catalyst comprises discrete sphere or cylinders of gamma-aluminum coated with at least one platinum group metal. This catalyst is referred to as a pellet type catalyst.

An example of an automobile catalytic converter is one referred to as a low-load catalyst weighing about 6.2 lbs and containing 0.026 oz Pt and 0.011 oz Pd which corresponds in troy ounces to about 8.41 oz/ton Pt and about 3.69 oz/ton Pd.

To dissolve the PGM's, about 5 grams of the catalyst in particulate form is slurried in 250 ml of sulfuric acid containing about 100 gpl $H_2SO_4$, about 100 gpl NaBr and about 0.004 molar $Br_2$ for about 2 hours at 70° C.

EXAMPLE 3

The invention is applicable to the dissolution of precious metals contained in electronic scrap. An example of such scrap is one containing about 49% Co, 48% Fe, 0.4% Rh, 0.4% Au and small amounts of residual metals.

To treat 100 grams of scrap, 500 ml of a sulfuric acid solution is used containing about 400 gpl $H_2SO_4$, about 100 gpl NaBr (about 1N) and about 290 gpl $Br_2$ (1.8M).

The dissolution is effected in several hours at a temperature of about 70° C.

EXAMPLE 4

Dissolution tests were conducted on a siliceous refractory gold ore obtained from the Dominican Republic. The chemical composition of the specific constituents of the ore in its natural state are as follows:

| Au | 3.29 ppm |
|---|---|
| Ag | 4.7 ppm |
| S | 6.8% |
| $C_{total}$ | 0.35% |
| Zn | 1.0% |
| Cu | 0.05% |
| As | 0.05 to 0.10% |

The ore in the unroasted state may contain at least one compound selected from the group consisting of sulfides, arsenides, tellurides, selenides, antimonides, and bismuthinides.

Prior to roasting, the ore is dry ground to 80% less than 44 microns. The roasting is generally conducted in the range of about 550° C. to 750° C. The temperature in the neighborhood of 700° provides good conversion of the sulfide sulfur and the best point for downstream extraction of gold.

In one test, the ore was subjected after dry grinding to an oxidizing roast of 700° C. for 30 minutes in a circulating fluid bed roaster with lime added in stoichiometric proportion of 150% to sulfur. The material was then reground in order to break up agglomerated calcine material. Approximately 50 grams of roasted material was then slurried in 250 ml of solution containing 2N $H_2SO_4$ (about 100 gpl) and approximately 10 gpl of NaBr. About 4 ml of Geobrom 3400 was added to maintain the redox potential at 700 mV. The leaching was carried out for approximately 2 hours at 70° C. Over 86% of the gold was extracted into solution at this point. Only 10 gpl NaBr was used in the test. Since most of the bromide was employed to complex the zinc which was present in relatively high quantities, it will be appreciated that much higher recoveries can be expected by employing higher bromide concentrations.

The method of the invention is applicable to the recovery of platinum group metals from South African matte derived from the dressing and treatment of a platinum-bearing deposit in South Africa. Such mattes contain about 46% Ni, 28% Cu and 23% sulfur. All of the PGM's plus gold and silver constitute about 0.18% of the matte by weight, the amount of precious metal in troy oz/ton being about 26.5 Pt, 16.04 Pd, 2.04 Rh, 0.29 Ir, 0.06 Os, 4.08 Ru, 1.16 Au and 2.04 Ag.

The precious metals are collected in an electrolytic sludge. The matte is first cast into anodes and the anodes subjected to electrolysis for the recovery of nickel and copper at the cathode with the precious metals reporting in the sludge.

Prior to the dissolution of the platinum group metals, the sludge is subjected to an oxidizing roast to remove sulfur following which the precious metals are dissolved using the sulfuric acid solution of the invention.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for the dissolution of at least one platinum group metal selected from the group consisting of platinum, palladium, rhodium and ruthenium which comprises:

subjecting a material containing at least one of said platinum group metals to dissolution with a sulfuric acid solution containing bromide ions and maintained at a pH of less than about 1 to complex said at least one platinum group metal with said bromide ions in the presence of bromine as an oxidizing agent, the amount of bromide ions in said solution being at least sufficient to form a soluble complex predominantly of said at least one platinum group metal, said bromine being an amount at least sufficient to maintain a redox potential of at least about 700 mv determined with reference to a standard calomel electrode (SCE) and thereby convert said at least one platinum group metal to an ionic form conducive to forming a soluble bromide complex thereof.

2. The method of claim 1, wherein said material containing said platinum group metal is selected from the group consisting of ore, metallurgical intermediates and metal scrap.

3. The method of claim 2, wherein said metal scrap is selected from the group consisting of jewelry scrap, electronic metal scrap and spent catalysts.

4. The method of claim 1, wherein an alkali or alkaline earth metal bromide is the source of bromide ions.

5. The method of claim 4, wherein the source of bromide ions is sodium bromide.

6. A method for the dissolution of at least one platinum group metal selected from the group consisting of platinum, palladium, rhodium and ruthenium which comprises:

subjecting a material containing at least one of platinum group metals to dissolution with a sulfuric acid solution containing bromide ions and maintained at a pH of less than about 1 sufficient to complex said at least one platinum group metal with bromide ions in the presence of bromine as an oxidizing agent, the amount of bromide ions being at least sufficient to form a soluble complex predominantly of said at least one platinum group metal plus a stoichiometric excess of at least about 0.01 molar of said bromide ions, said bromine being an amount at least sufficient to provide a redox potential of at least about 700 mv determined with reference to a standard calomel electrode (SCE) to maintain said at least one platinum group metal in an ionic form conducive to forming a soluble bromide complex thereof.

7. The method of claim 6, wherein said platinum group metal-containing material is selected from the group consisting of ore, metallurgical intermediates and metal scrap.

8. The method of claim 7, wherein said metal scrap is selected from the group consisting of jewelry scrap, electronic metal scrap and spent catalysts.

9. The method of claim 6, wherein an alkali or alkaline earth metal bromide is the source of bromide ions.

10. The method of claim 9, wherein said source of bromide ion is sodium bromide.

* * * * *